July 23, 1935.  F. A. PARSONS  2,008,769
CONTROL DEVICE
Filed Dec. 6, 1929  3 Sheets-Sheet 1
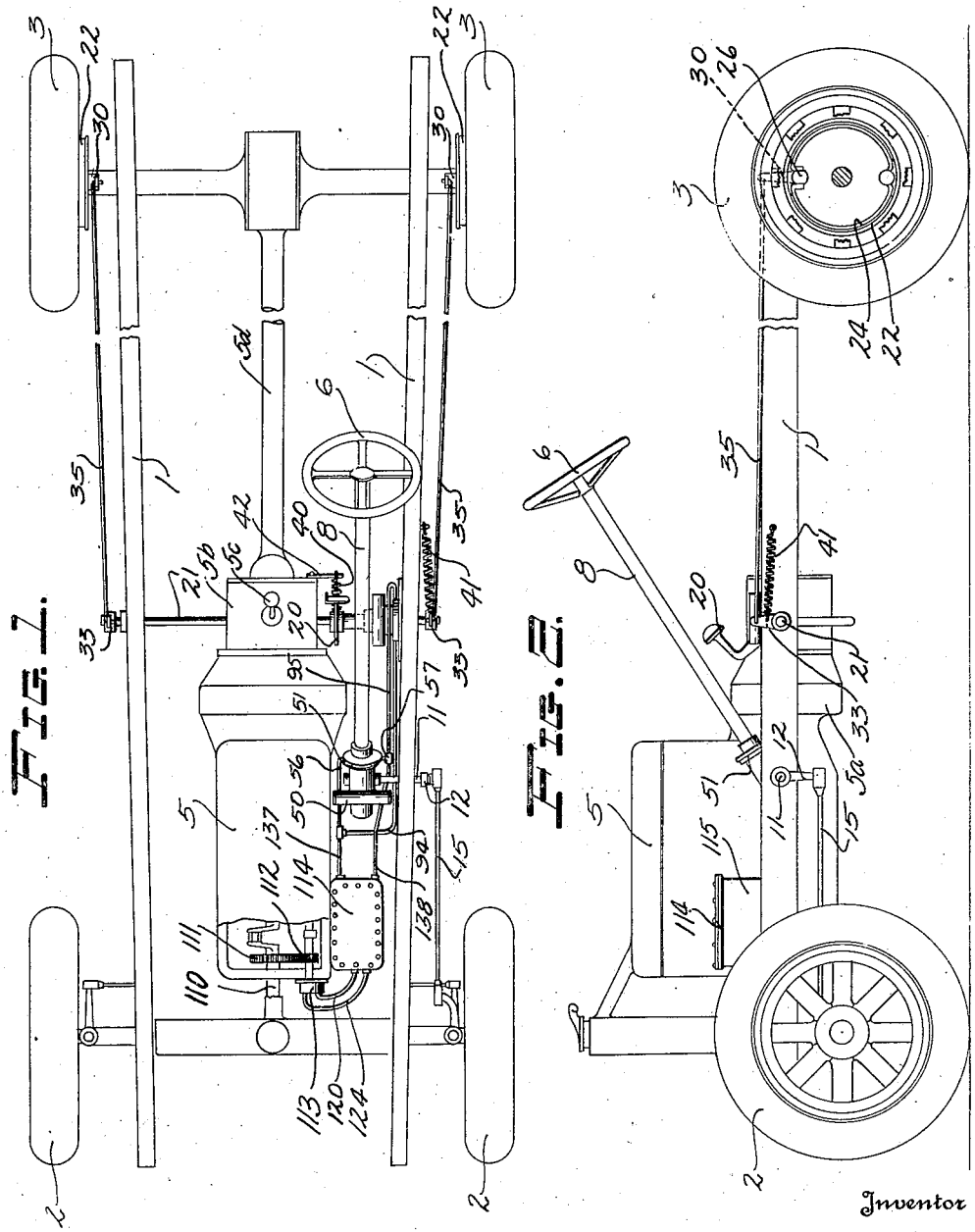
Inventor
Fred A. Parsons
By Wheeler, Wheeler & Wheeler
Attorneys July 23, 1935.  F. A. PARSONS  2,008,769
CONTROL DEVICE
Filed Dec. 6, 1929   3 Sheets-Sheet 2
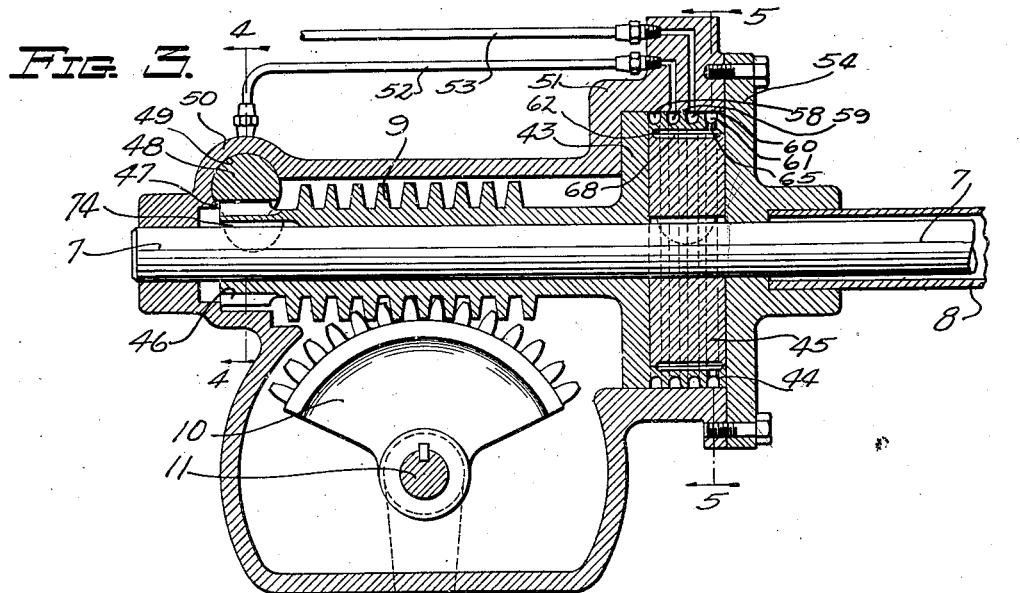
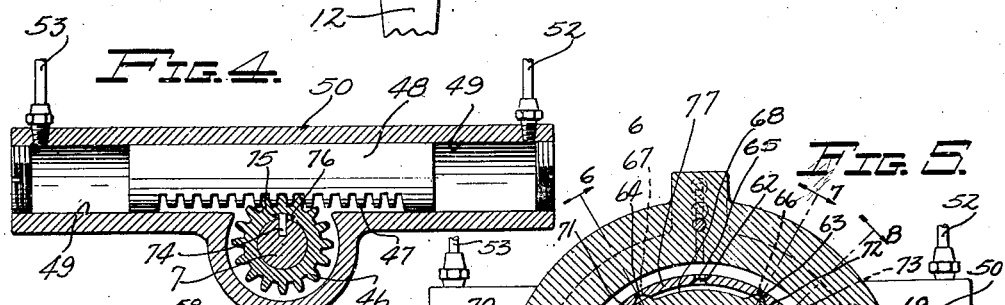
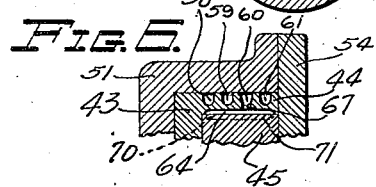
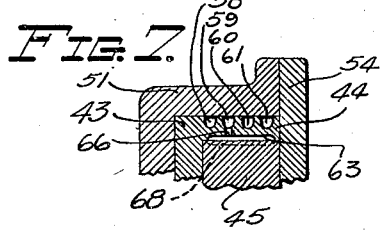
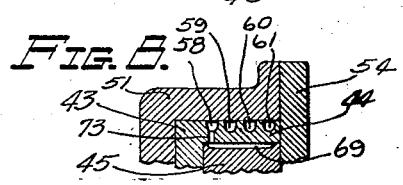
Inventor
Fred A. Parsons
By Wheeler, Wheeler & Wheeler
Attorneys July 23, 1935.　　F. A. PARSONS　　2,008,769
CONTROL DEVICE
Filed Dec. 6, 1929　　3 Sheets-Sheet 3
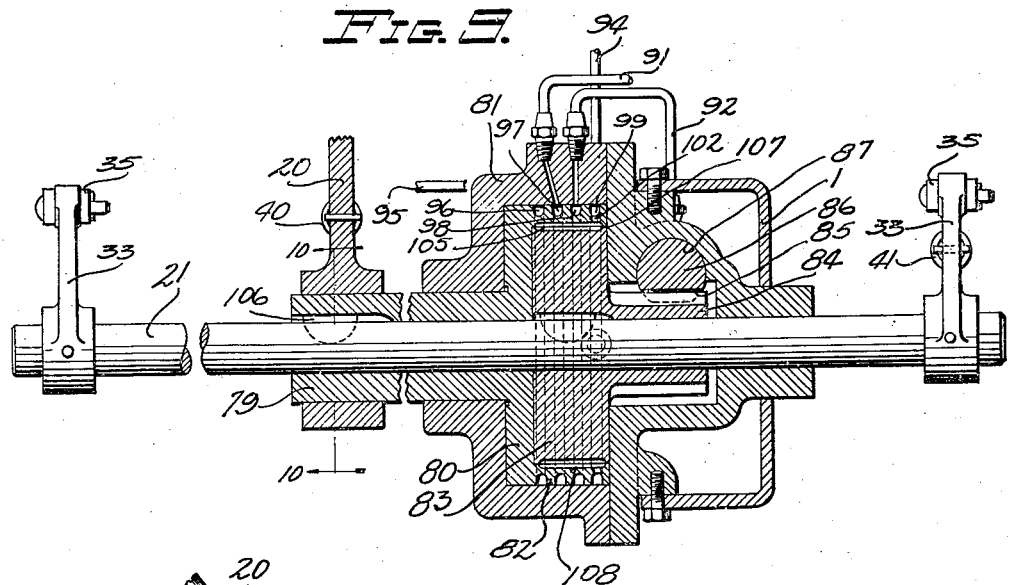
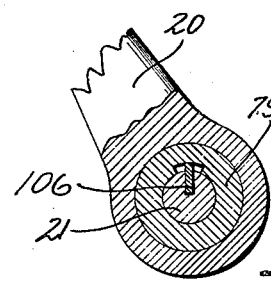
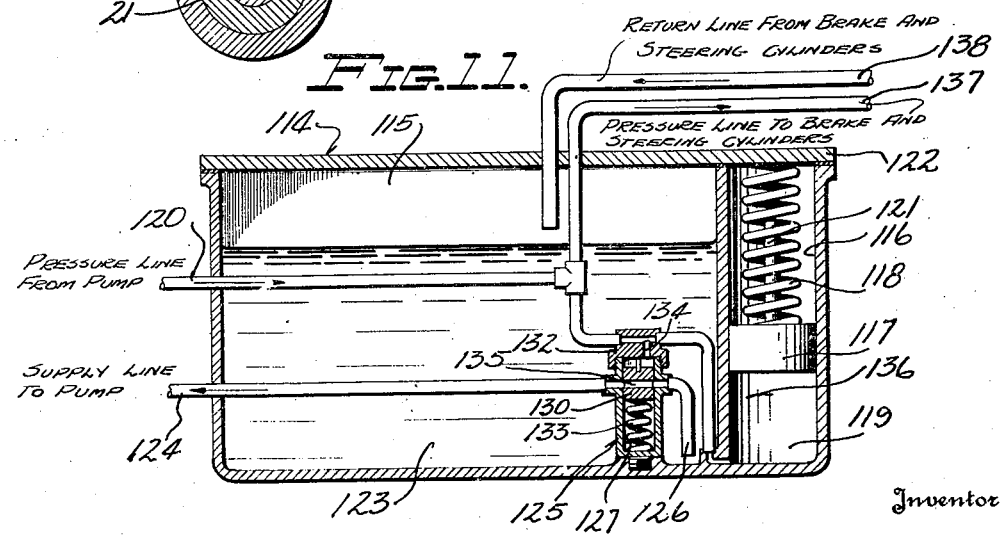
Inventor
Fred A. Parsons
By Wheeler, Wheeler & Wheeler
Attorneys Patented July 23, 1935

2,008,769

UNITED STATES PATENT OFFICE 2,008,769

CONTROL DEVICE

Fred A. Parsons, Milwaukee, Wis.

Application December 6, 1929, Serial No. 412,252

6 Claims. (Cl. 180—79.2)

This invention relates to control devices and more particularly to devices in which a power operated controller or shifter is actuated in substantially exact accordance with the movement of a master control which is itself free of load.

A purpose of the invention is to provide control means in which a master controller may be moved by a relatively very weak force, yet may control the movement of devices or objects requiring relatively very great force for their movement.

A further purpose is to provide a control such as just mentioned, in which the device is so constructed that should the power for operation of the controller or shifter fail for any reason, such force as may be available from the master controller is applicable for the desired movement of the part or thing to be moved. As an illustration, when the device is used for the power steering of an automobile or truck it is highly important that the vehicle should be manually dirigible if the power device should for any reason fail to operate.

A further purpose is to provide a construction such that should the power for the controller or shifter for any reason fail the master controller is not only operative to directly control the part or thing to be moved, but is movable in substantially the same manner or through substantially the same cycle of travel, so that for instance in the case of a power steered vehicle, the operator is under no necessity of shifting from one mode of operation to another in the case of the failure of the power to function properly.

A further purpose is to provide a device which in effect amplifies the power of a master controller and applies such amplified or increased power for the movement of the part or thing to be moved in exact accordance with the movement of the master controller.

Another purpose is to provide improved hydraulic or fluid means for accomplishing the above mentioned objects whereby certain advantages inherent in hydraulically operated devices may be had.

Another object is to provide an improved power operated system of vehicle control, particularly for the steering gear and brakes of automotive vehicles such as trucks or passenger vehicles, buses, tractors, etc.

Another object is generally to simplify and improve the construction and operation of control devices for the above mentioned purposes and for still other purposes which will be apparent from this specification.

The invention consists in the structure herein illustrated, described and claimed, and in such modifications of this structure illustrated and described as may be equivalent to the claims.

In the drawings the same reference characters have been used to indicate the same parts in each of the various views of which—

Figure 1 shows a top or plan view partly diagrammatic, of an automobile chassis, in which the steering and braking mechanism incorporates the invention. Certain well known chassis portions not necessary to an understanding of this invention have been omitted.

Figure 2 is a left side view or elevation of the same chassis.

Figure 3 is a vertical section through the lower portion of the steering shaft taken along line 3—3 of Fig. 1.

Figure 4 is a section along line 4—4 of Fig. 3.

Figure 5 is a sectional view taken in the plane indicated at 5—5 in Fig. 3.

Figures 6, 7 and 8 are partial sections along radial lines 6—6, 7—7, and 8—8 respectively of Fig. 5.

Figure 9 is a transverse vertical section through the brake actuating rock shaft and power relay for operating such shaft in accordance with brake pedal movement.

Figure 10 is a detail taken in section in the plane indicated at 10—10 of Figure 9.

Figure 11 is a sectional view of the pressure reservoir and associated parts.

The chassis here shown includes a frame generally denoted as 1 supported in any suitable manner from front or steering wheels 2 and rear or driving wheels 3, and supporting a motor or engine generally denoted as 5, connectible to drive the driving wheels 5 through the usual transmission mechanism generally denoted as 5a. Fig. 1.

The front wheels 2 may be manually shifted for steering purposes by any suitable mechanism. For illustrative purposes such mechanism as shown in the drawings includes a hand wheel 6 fixed on a steering shaft 7 supported and guided in a tubular shaft housing 8 suitably fixed with frame 1. On the lower end of shaft 7 is keyed a worm 9 meshing with a segment 10 fixed on a shaft 11 supported from frame 1. Also fixed on shaft 11 is a lever 12 connected by means of the usual link 15 to the steering knuckle and tie rod assembly by which the dirigible stub axles are controlled in the usual way.

Brakes may be manually operated on each of the driving wheels 3 by any suitable mechanism. By way of example the drawings show mechanism including a spring supported foot pedal or lever 20 loosely connected for movement with a shaft 21 supported from frame 1. Fixed with the respective rear wheels are brake drums 22 within each of which operate brake shoes such as the shoes 24. The shoes of the different drums may be expanded in the usual way to grip the drums by means of rotatable or oscillating cam members 26 to which are attached levers 30 which are connected for movement from a shaft 21 by the means of similar levers 33 and link rods 35.

Since the foot pedal 20 is conveniently manually operable in only one direction, that is to say in the direction to apply the brakes, the other direction of movement in brake releasing direction is brought about by a spring 40 secured to the pedal 20 and to fixed arm 42. A supplemental spring 41 acts similarly on the brake connections themselves through arm 33 on shaft 21.

This invention contemplates that neither of the direct actuating connections to the steering wheels and brakes thus far described need be used normally but both are present for emergency use. In each case, however, power means is provided for control independently of the direct driving means and normally operative to the exclusion of the direct driving connections.

The power mechanism provided to shift the steering mechanism in accordance with the hand movement of wheel or handle 6 is as follows:

Fixed with worm 9 at the end thereof is a valve member generally denoted by the numeral 43 having an annular portion or ring 44, (Figs. 3, 5, 6, 7 and 8) within which is closely rotatably fitted a valve member 45 which is rigidly fixed for rotation with steering shaft 7.

Also fixed rigidly upon worm 9 there is a gear 46, Figs. 3 and 4, meshed with which are rack teeth 47 on a plunger or piston 48 closely but slidably fitted in a bore 49 in a housing generally denoted by the numeral 50. The ends of bore 49 are closed as shown in Fig. 4 to form cylinders within which the plunger 48 may be operated in the one direction by means of fluid supplied through a channel or pipe 52, Figs. 4 and 5, and in the other direction by the means of fluid supplied through a pipe or channel 53.

The members 44 and 45 are enclosed within housing 51 by means of a removable cover 54, Fig. 3, and together provide a valve means in which the movement of member 45 in accordance with the movement of hand wheel 6 serves to connect one or the other of the channels 52 or 53 with a fluid supply channel or pipe 56, (Fig. 5), and simultaneously to connect the other channel 52 or 53 with an exhaust pipe or channel 57.

The arrangement of channels or ports for accomplishing this result is as follows:

The member 44 is provided on its periphery with annular grooves 58, 59, 60 and 61, (Figs. 3, 6, 7 and 8) continuously communicating, respectively, with the exhaust channel 57, with the channel 52 leading to the right end (Fig. 4) of bore 49, with the channel 53 leading to the left end (Fig. 4) of bore 49, and with the supply channel 56. On its inside surface the member 44 is provided with axially extended grooves 62, 63, 64, (Figs. 5, 6, 7 and 8), continuously communicating, respectively, with the supply groove 61 through a channel 65, (Fig. 5), with groove 59 and pipe 52 through a channel 66 (Fig. 7); and with groove 60 and pipe 53 through a channel 67, Fig. 6.

The arrangement of annular grooves provide a means for maintaining the power supply lines in communication with respective ports in all rotative positions of the parts.

Axially extended grooves 68, 69 and 70, Figs. 3, 5, 6, and 7 in the peripheral surface of member 45 are constructed to provide cut away portions leaving land portions 71, 72, Fig. 5, which in the normal position of valve 45 close both grooves 63 and 64, but in case the member 45 is slightly rotated relative to member 44 in the one direction the supply groove 62 will communicate with groove 63, and if the rotation is in the other direction the supply groove 62 will communicate with groove 64. At the same time the one of grooves 63 and 64 which is not in communication with groove 62 is uncovered to communicate with the one of the grooves 69 and 70 each of which is continuously in communication with the exhaust, there being for each groove 69 and 70 a channel communicating with the annular exhaust groove 58. Such communication is illustrated for the groove 69 in Fig. 8, by the means of channel 73, but the communication of groove 70, being exactly similar, it not shown.

To permit such relative rotational displacement of the members 44 and 45, the worm 9 with which member 44 is fixed, is slightly loose in its splined connection with steering shaft 7 upon which member 45 is rigidly fixed. Such looseness or lost motion is in the present instance accomplished by providing some space between the key 74 and the sides of the complementary spline groove in pinion 46 as shown in exaggerated degree at 75 and 76, Fig. 4. The looseness or lost motion is such as to permit the steering shaft and member 45 to move slightly in either direction from the position in which both grooves 63 and 64 are closed from supply groove 62, whereby to admit fluid through the various channels to cylinder bore 49 before the splined connection of shaft 7 and worm 9 causes worm 9 to move. The direction in which fluid is admitted to cylinder bore 49 is always such as to move plunger 48, gear 46, and worm 9 in the same direction in which this assembly would be moved later by the key connection with shaft 7, but, provided fluid under pressure is continuously supplied to the channel 56 the worm 9 will never be moved through the key 74 but always by plunger 48 operating in bore 49.

It will be noted that the effect of the arrangement is that in either direction of movement of hand wheel 6 and shaft 7, the valve mechanism controls admit fluid to cylinder 49 to force the worm to follow the movement of the wheel and shaft as long as the wheel and shaft continue to move, but when the wheel movement stops or immediately thereafter, the valve cuts the cylinder 49 off from the fluid supply, and movement of the worm also stops. If the fluid supply for any reason should fail or if the fluid pressure should be inadequate for the resistance encountered the worm may still be moved or assisted in its movement by the manual power applied through key 74, the hand wheel 6 being substantially similarly moved in either event.

The various grooves and channels effective between members 44 and 45 to control the fluid as described constitute a group of parts generally denoted by the numeral 77, Fig. 5. A duplicate group 78, Fig. 5, is positioned on the opposite side of the axis of shaft 7, the two groups forming an opposed or balanced pair operative substantially to balance any pressure tending to increase the frictional resistance between the members 44 and 45 of valve 55. The second group of parts is also desirable as permitting fluid to be admitted more quickly to the cylinder 49. For the same reason still other similar groups of parts may be arranged about the axis of member 44, preferably in balanced pairs.

Owing to the axial length of the grooves forming the ports and to the several groups of similarly acting ports the lost motion required at 75 and 76 need be relatively very small in amount while still permitting a sufficient port area for worm 9 to follow a very rapid movement of hand wheel 6. Additional axial length of individual ports or an additional number of ports may be provided for substantially any speed of response desired.

The operation of the steering mechanism is as follows:

As long as the power supply remains operative, steering will be done entirely by power. Although means is always available for the operation of the steering mechanism by hand in the usual way, such means is not normally effective because of the provision of lost motion between the hand operated steering shaft 7 and the worm 9, due to the play between key 74 and key slot 76, as shown in Figure 4.

The same lost motion which prevents the steering shaft from directly operating upon the worm controls the application of power to the worm, it being important to note that the power is applied to the worm itself so that steering takes effect through the usual irreversible connections, just as in hand steering.

The limited independent movement of shaft 7 with respect to the worm in either direction, displaces the valve member 45 with respect to its complementary valve member 43 for a sufficient distance to establish communication to that end of cylinder 49 which will occasion a movement of piston 48 and worm 9 in the identical direction in which the hand movement of shaft 7 has been initiated. As above noted, the piston 48 acts directly upon the worm itself, the entire apparatus being assembled in a single unit.

The power applied through the fluid pressure acting on piston 48 in cylinder 49 moves the worm for a distance corresponding to the distance to which shaft 7 and valve member 45 have been moved. The complementary valve member 43, being connected with the worm, ultimately reaches its original location with respect to valve member 45, thereby cutting off all flow of liquid to the cylinder 49 and restoring the balance of the parts. From this new position the parts may again be moved in either direction by initiating movement in the steering shaft 7, thereby displacing valve member 45 with respect to valve member 43 and establishing communication between the source of power and the cylinder 49. As above noted, the duplication of the series of ducts 77 by a similar series 78, and the elongation of the ports which register upon relative displacement of valve member 45, are such as to give a very speedy response of the power operated mechanism. Thus, in all ordinary steering operations the power mechanism will follow the movement of the hand wheel just as rapidly as the hand wheel can be turned. It is only when there is a power failure that the key 74 is ever effective to transmit motion from shaft 7 directly to the worm 9.

Power mechanism is provided as follows to shift the brakes in accordance with the movement of the operator's handle, which for convenience is illustrated as comprising the accustomed foot pedal 20:

Foot pedal 20 is fixed on the extended hub 79, Fig. 10, of a valve member 80 enclosed within a housing 81 and having an annular portion or ring 82 within which is closely rotatably fitted a valve member 83 which is rigidly fixed for rotation with the shaft 21. Also fixed on the hub 79 of member 80 is a gear or segment 84 (Fig. 9) meshed with which are rack teeth 85 on a plunger or piston 86 closely but slidably fitted in a bore 87 in the housing 80. The ends of bore 87 are closed as in bore 49 (Fig. 4) whereby to form a cylinder within which the plunger 86 may be operated in the one direction by the means of fluid supplied through a channel or pipe 91 (Fig. 9), or in the other direction by the means of fluid supplied through a pipe or channel 92. These pipes correspond with pipes 52 and 53 (Fig. 4).

The members 82 and 83 together provide a valve means operative in accordance with the movement of foot pedal 20 to connect one or the other of the channels 91 and 92 with a fluid supply channel or pipe 94 (Fig. 10) and to simultaneously connect the other channel with an exhaust or outlet pipe or channel 95. The arrangement of channels or ports within valve 93 for such result may be identical with the previously described valve (Figs. 3 and 5 to 8) and includes peripheral grooves 96, 97, 98 and 99 (Fig. 9) in member 82 and respectively continuously communicating by the means of suitable channels in the casing 81, with the exhaust channel 95, with the channel 91, with the channel 92 and with the supply channel 94.

There are also, as in the valve first described, axially extended channels or grooves in the inside surface of member 82, respectively continuously communicating by the means of suitable channels through member 82, with the exterior annular channels which communicate with the channel 91, supply channel 94 and channel 92. One of these is shown at 102 in Fig. 9.

There are also, as in the steering control valve, axially extended channels in the periphery of member 83, forming cut away portions and lands adapted normally to close the supply from both ends of the cylinder 98 but adapted to provide communication to the proper end of plunger 86 in case the member 82 is rotated slightly. One such channel is shown at 105 in Fig. 9.

The whole arrangement corresponds exactly with that used for steering, in that the driven member is actuated by power in the same direction as the driving member would actuate it if positively connected thereto. The positive connection is always potentially present but is ineffective unless the power operation fails during the degree of lost motion provided.

To permit such relative rotational displacement between members 82 and 83 as is required to set the power actuating mechanism in operation, the key 106 (Fig. 10) which restrains member 82 to move with shaft 21 on which member 83 is fixed, is provided with lost motion exactly similar to the lost motion previously described for the similarly acting key 74. The degree of lost motion required is exaggerated in the drawings.

The various grooves and channels effective between members 82 and 83 to control the fluid as described, constitute a group of parts or controls generally denoted by the numeral 107 (Fig. 9). Another similar control group 108, is positioned on the opposite side of the axis of shaft 21 for reasons pointed out for the similar pair of ports of the steering control valve and still other pairs may be added if desired, for reasons explained. The effect of the arrangement including valve 83 and cylinder 80 is that in either direction of movement of foot lever 20 the shaft 21 and the brakes with which it is connected, will be forced to follow the movement of the foot lever. If, however, the fluid supply for any reason should fail, or if the fluid pressure is inadequate for the desired braking effect, the shaft 21 may still be moved or assisted in its movement by the pressure on the foot pedal applied to shaft 21 directly through hub 79 and key 106.

Although the power movement may be had for either direction of brake movement, power is normally required only in the braking direction and in the other direction the spring 41 Fig. 2 returns shaft 21 and the parts connected therewith to a position corresponding to the released position of the brakes. It is to be noted that as the shaft 21 is turned by the spring 41 the valve 80 normally acts to prevent the brake connections from over running the foot lever, irrespective of key 106, such action being merely the reverse of the action previously described. The function of the mechanism described is to prevent or correct by power, any displacement between two members thereof.

The operation of the brake applying mechanism is essentially similar to the operation of the steering mechanism as above described. In each case a limited degree of lost motion in the direct manually operable connections is provided to control the application of power, the direct manual connection being always available in the event of a power failure.

For supplying fluid to the channels 56 and 94 there is provided the following mechanism:

Fixed on the crankshaft 110, Fig. 1, of engine 5, is a gear 111, which may be a gear used for one of the essential functions of the engine such as driving the cam shaft, but in any case should be operative whenever the engine is running, that is to say, irrespective of the position of the usual motion interrupting clutch mechanism generally denoted at 5a, Fig. 2, and irrespective of the position of the transmission or rate change mechanism of the vehicle, generally denoted at 5b, Fig. 1, and operated from the hand lever 5c. Driven from the gear 111 is a gear 112, Fig. 1, fixed on the driving shaft of a pump, generally denoted by the numeral 113, and which may be of any positive delivery type. Fixed with the engine is a unitary mechanism generally denoted by the numeral 114, (Fig. 1). Unit 114 provides a casing, or housing 115 (Figs. 1 and 11) fixed with the engine frame and a cylinder 116 within casing 115, and in which is closely fitted a piston 117 continuously urged by a spring 118. The closed end 119 of cylinder 116 is in communication with the outlet or pressure port of pump 113 by the means of a channel or pipe 120 whereby fluid delivered from the pump is delivered to the cylinder to move the piston 117 against the resistance of spring 118 until a shank or stop 121 fixed with the piston contacts a cover 122. The inlet or suction port of pump 113 communicates with a reservoir 123, containing a substantially incompressible fluid such as oil, through a pipe or channel 124, Figs. 1 and 11, a cut off throttle generally denoted as 125, and a pipe or channel 126 extending below the fluid level.

The cut off throttle 125 consists of a cylinder 127 Fig. 11 within which a piston or plunger 130 is closely fitted. Cylinder 127 is closed by the means of a cap 132 and any fluid pressure set up by pump 113 tends to move the piston 130 against the pressure of a spring 133, there being a channel 134 delivering fluid from the pressure channel 120 to act against the piston end. The piston 130 is provided with a passage or port opening 135, which for any normal pressure within channel 120 provides a free passage between channels 126 and 124 whereby fluid may be drawn from the reservoir to the pump, but after piston 117 has been moved by such fluid until stop 121 contacts cover 122 the pressure in channel 120 and against piston 130 rises to a value which moves the piston 130 against the resistance of spring 133 until passage 135 is out of registry with channels 126 and 124, and no more fluid is pumped until the pressure in channel 120 drops sufficiently for spring 133 to move the piston for channel 135 to cause communication between channels 124 and 126.

The cylinder 116 and piston 117 provide an accumulator or storage device for fluid under pressure and which is generally denoted by the numeral 136, Fig. 11. Such accumulator is continuously maintained substantially filled with fluid by the means of the pump 113 which runs continuously, whenever the engine is running, but is prevented from pumping any fluid except just sufficient to maintain the fluid in the accumulator by the means of the cut off throttle 125. Such construction provides that, although pump 113 is of positive delivery type and continuously running, there is substantially no power consumed except that required to pump the fluid volume actually used, and for this, and other reasons, the arrangement is much preferable to accumulators charged from a pump which is continuously pumping a positive volume and in which the surplus fluid is being passed through a relief valve.

Accumulator 136 is used as a continuously available supply source for both the fluid operated devices previously described, there being a channel or pipe 137, (Figs. 1 and 11) communicating from the pressure channel 120 to the supply channels 56 and 94, (Figs. 1, 5 and 9) of the respective devices.

The exhaust or outlet channel 57 (Fig. 5) and channel 95 (Fig. 9) of the respective devices, each communicates with the reservoir 123 through a channel 138, (Fig. 11) whereby fluid used in the operation of the devices is returned to be used to again charge the accumulator 136.

It is to be understood that the mechanism herein illustrated and described is illustrative of a great variety of mechanisms generally characterized by the fact that a relatively weak force operating to move a governing element may release and control a force as large as may be desired for the movement of a driven part in substantial accord both as to rate and direction of movement with the movement of the governing element.

I claim:

1. In a control device, the combination with a rotatable driven member and a manually operable driving member loosely keyed to the driven member for a limited movement independently thereof and adapted with a predetermined degree of lost motion for the actuation of the driven member in either direction, means for applying power for the direct actuation of the driven member in either direction, and means operable by the movement of the manually operable member respecting the driven member within said range of lost motion to control the application of said power to the driven member in a direction corresponding to that in which the driven member will ultimately be actuated by the manually operable member if the limit of lost motion between said members is reached, together with substantially irreversible motion transmitting connections leading from said driven member for the delivery of the power of said control device.

2. A control device comprising the combination with a manually rotatable driving member, of a co-axially rotatable driven member loosely keyed to the driving member, casing means provided with bearing supports for the shaft and member, mutually co-operative valve elements connected with the respective members and provided with ports registerable upon the relative movement of said members respecting each other within the range permitted by the lost motion of said key, fluid supply means leading to said valve elements, a plunger reciprocable in said casing provided with rack teeth, said casing having a cylinder bore at each end of the plunger ducts affording communication between said valve elements and the respective cylinder bores, and pinion teeth connected with the driven member and meshing with the rack teeth of said plunger.

3. In a control device, the combination with a driving control member and a driven control member, of a lost motion connection directly between said members for the direct operation of one by the other following a predetermined relative movement, a plunger acting upon the same member as said lost motion connection, a cylinder in which said plunger is reciprocable, a source of fluid under pressure, and valve means controlled by a relative movement between said members for applying fluid from said source to said piston in a direction to operate the driven member in advance of its operation through said lost motion connections, said driven member having an operating part and worm and worm gear connections thereto adapted to be moved thereby alike whether said driven member is actuated by fluid pressure or through said lost motion connections.

4. In a steering gear, the combination with a steering shaft, a steering worm, and a rock shaft arranged to be operated by said worm, of a direct lost motion connection between said shaft and worm for the manual operation of the worm in the event of power failure, power operated means for acting directly upon said worm, and means controlled by lost motion between said worm and shaft for applying power through said means for the rotation of said worm in the direction and to the extent of shaft rotation, whereby steering motion is transmitted to said rock shaft in the same manner whether said worm is operated by hand or power.

5. In a steering gear, a unitary assembly including a casing, a steering gear therein, a rock shaft provided with means intermeshing with said gear to receive motion therefrom, said gear and means comprising a substantially irreversible connection, and means alternatively available for acting directly upon said gear within said casing either by hand or by power to cause rotation thereof.

6. In a steering gear, a unitary assembly including a casing, a steering gear therein, a rock shaft provided with means intermeshing with said gear to receive motion therefrom, and means alternatively available for acting directly upon said gear within said casing either by hand or by power to cause rotation thereof, the hand operating means comprising a shaft loosely keyed to said worm and the power operating means comprising a piston mechanically connected to rotate said worm in either direction according to the direction of piston reciprocation, a cylinder in which said piston is operable, fluid pressure ducts leading to the ends of said cylinder, and a control valve including parts respectively connected with said shaft and with said gear and adapted upon occurrence of relative movement between said shaft and gear, and within the limits of said lost motion connection, to control a pressure differential between the ends of said cylinder such as to move the gear in anticipation of the movement which would otherwise be occasioned therein through said lost motion connection.

FRED A. PARSONS.